United States Patent
Bishop et al.

(10) Patent No.: US 10,284,835 B2
(45) Date of Patent: May 7, 2019

(54) PHOTO-REALISTIC SHALLOW DEPTH-OF-FIELD RENDERING FROM FOCAL STACKS

(71) Applicant: Apple Inc., Cupertino, CA (US)

(72) Inventors: Thomas E. Bishop, San Francisco, CA (US); Alexander Lindskog, Santa Clara, CA (US); Claus Molgaard, Los Gatos, CA (US); Frank Doepke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 14/864,650

(22) Filed: Sep. 24, 2015

(65) Prior Publication Data
US 2017/0070720 A1   Mar. 9, 2017

Related U.S. Application Data

(60) Provisional application No. 62/214,772, filed on Sep. 4, 2015.

(51) Int. Cl.
*H04N 13/106* (2018.01)
*G06T 5/00* (2006.01)
(Continued)

(52) U.S. Cl.
CPC .......... *H04N 13/106* (2018.05); *G06T 5/002* (2013.01); *G06T 7/593* (2017.01); *H04N 5/2356* (2013.01); *H04N 5/23229* (2013.01)

(58) Field of Classification Search
CPC .............. H04N 5/23212; H04N 13/02; H04N 13/0007; H04N 5/2329; H04N 1/40012; H04N 5/2226; H04N 5/23229; H04N 13/106; G06K 9/34; G06K 9/40; G06K 9/00; G04N 13/0239; G06T 5/002; G06T 7/0075; G06T 2207/20092; G06T 5/003; G06T 2207/10148; G06T 2207/10028;
(Continued)

(56) References Cited

U.S. PATENT DOCUMENTS 7,929,801 B2   4/2011   Nakamura
8,335,390 B2   12/2012   Li
(Continued)

FOREIGN PATENT DOCUMENTS

| CN | 101764925 A | 6/2010 | |
|---|---|---|---|
| EP | 2442272 A1 * | 4/2012 | ............. G06T 5/003 |
| EP | 2442272 A1 | 4/2012 | |

OTHER PUBLICATIONS

Green et al., "Multi-Aperture Photography" ISSN:0730-0301; DOI; 10.1145/1239451.1239519 (Year: 2007).*
(Continued)

*Primary Examiner* — Dramos Kalapodas
(74) *Attorney, Agent, or Firm* — Blank Rome LLP

(57) ABSTRACT

Generating an image with a selected level of background blur includes capturing, by a first image capture device, a plurality of frames of a scene, wherein each of the plurality of frames has a different focus depth, obtaining a depth map of the scene, determining a target object and a background in the scene based on the depth map, determining a goal blur for the background, and selecting, for each pixel in an output image, a corresponding pixel from the focus stack.

20 Claims, 6 Drawing Sheets

(51) Int. Cl.
*H04N 5/235* (2006.01)
*H04N 5/232* (2006.01)
*G06T 7/593* (2017.01)

(58) Field of Classification Search
CPC ....... G06T 2200/21; G06T 2207/20221; G06T 5/50; G06T 2207/10052; G06T 11/60; G06T 7/593; G02B 27/0081; G02B 21/367; G02B 27/0075
See application file for complete search history.

(56) References Cited

U.S. PATENT DOCUMENTS

| | | | | |
|---|---|---|---|---|
| 8,406,548 B2* | 3/2013 | Ali | ................... | G06T 5/002 382/254 |
| 8,818,082 B2* | 8/2014 | Schiller | ................... | G06T 11/60 382/159 |
| 8,988,592 B2 | 3/2015 | Takahashi | | |
| 8,989,517 B2 | 3/2015 | Morgan-Mar | | |
| 2007/0019883 A1* | 1/2007 | Wong | ................... | G06T 7/571 382/276 |
| 2007/0286520 A1* | 12/2007 | Zhang | ................ | G06K 9/00228 382/264 |
| 2008/0218611 A1* | 9/2008 | Parulski | ............... | H04N 5/2258 348/262 |
| 2012/0007940 A1* | 1/2012 | Michrowski | ........... | H04N 7/147 348/14.07 |
| 2012/0057070 A1 | 3/2012 | Park | | |
| 2013/0033582 A1* | 2/2013 | Sun | ................... | G06T 5/002 348/47 |
| 2013/0033586 A1* | 2/2013 | Hulyalkar | .......... | H04N 13/0007 348/51 |
| 2013/0063566 A1* | 3/2013 | Morgan-Mar | .......... | G06T 7/571 348/46 |
| 2013/0208093 A1 | 8/2013 | Sun | | |
| 2013/0266210 A1* | 10/2013 | Morgan-Mar | ......... | G06T 7/0051 382/154 |
| 2013/0286259 A1 | 10/2013 | Tanaka | | |
| 2014/0152886 A1* | 6/2014 | Morgan-Mar | ..... | H04N 5/23212 348/349 |
| 2014/0267243 A1* | 9/2014 | Venkataraman | ...... | G06T 7/0065 345/419 |
| 2015/0002724 A1 | 1/2015 | Chuang | | |
| 2015/0279012 A1* | 10/2015 | Brown | .................... | G06T 5/003 382/284 |

OTHER PUBLICATIONS

Levin et al., "Image Depth From a Conventional Camera With a Coded Aperture"; ISSN: XP002622004 (Year: 2007).*

Gupta, Sahil Mohan, "Huawei Honor 6 Plus review: Full focus on camera features," India Today, Mar. 24, 2015, retrieved from the internet: URL: http://indiatoday.intoday.in/technology/story/huawei-honor-6-plus-review-camera-phone/1/425442.html.

Isaksen, et al., "Dynamically Reparameterized Light Fields," SIG-GRAPH '00 Proceedings of the 27th annual conference on Computer graphics and interactive techniques, Jul. 1, 2000, retrieved from the internet: URL: http://www.cs.harvard.edu/~sjg/papers/drlf.pdf.

International Search Report and Written Opinion received in PCT Patent Application No. PCT/US2016/042816, dated Oct. 25, 2016.

* cited by examiner

PHOTO-REALISTIC SHALLOW DEPTH-OF-FIELD RENDERING FROM FOCAL STACKS

BACKGROUND

This disclosure relates generally to the field of digital image capture and processing, and more particularly to the field of photo-realistic shallow depth-of-field rendering from focus stacks. A camera can adjust a lens stack to obtain focus on an object. A camera's autofocus (AF) system, for example, can automatically adjust the lens stack to obtain focus on a subject. A particular image may have several objects that should be in focus.

A focus stack provides a set of images with a variety of focus settings such that various objects in the image appear to be in focus in different images. Focus stacking combines multiple images having different points of focus to create a final image with better overall focus than the individual images. Sweeping the lens stack from macro to infinity is required in order to ensure that all points in the scene are captured in focus. For example, a camera may capture images with a lens stack at a series of predetermined depths. At each depth, a different portion of the image may be in focus. By combining the various images into a focus stack, the final image will have multiple points of focus.

By its very nature the use of focus stacks requires capturing multiple images, resulting in a tradeoff between frame capture and performance. With a low number of frames, there may be parts of the scene that are not captured in focus, however processing power will be optimal. Conversely, a better result requires the capture of more frames to ensure that all parts of the scene can be captured in focus. However, the more images that are captured, the more processing power is required and memory to store the various images for processing.

SUMMARY

In one embodiment, a method for generating an image with a selected level of background blur is described. The method includes capturing, by a first image capture device, a plurality of frames of a scene, wherein each of the plurality of frames has a different focus depth, obtaining a depth map of the scene, determining a target object and a background in the scene based on the depth map, determining a goal blur for the background, and selecting, for each pixel in an output image, a corresponding pixel from the focus stack. The method also includes selecting, for each pixel corresponding to the target object, the corresponding pixel from a frame in the focus stack where the target object is in focus, and selecting, for each pixel corresponding to the background, the corresponding pixel from a frame in the focus stack where the background corresponds to the goal blur, and generating, the output image using the selected corresponding pixels.

In another embodiment, the method may be embodied in computer executable program code and stored in a non-transitory storage device. In yet another embodiment, the method may be implemented in an electronic device having image capture capabilities.

DETAILED DESCRIPTION

Figure 1:
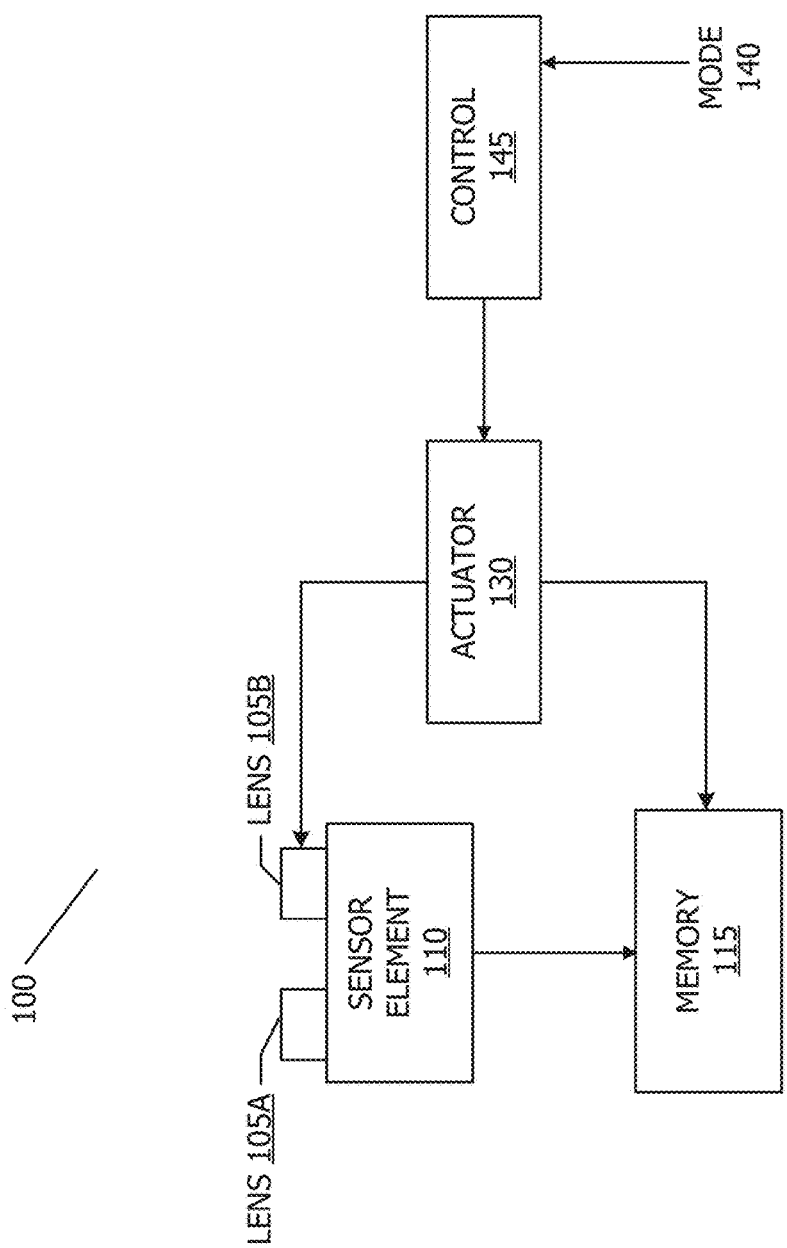
FIG. 1 shows, in block diagram form, a simplified camera system according to one or more embodiments.

This disclosure pertains to systems, methods, and computer readable media for optimizing generation of a focus stack. In general, techniques are disclosed for using a focus stack to generate an image with a selected level of background blur. In one or more embodiments, the focus stack may be generated by a single camera, or by a multi-camera system. In addition, in one or more embodiments, a depth map is used to distinguish target foreground objects from the background. For each pixel in an output image, a corresponding pixel is selected from the focus stack based on an intended blur of the item captured by the pixel. For example, a pixel that is part of the foreground target object will be taken from a frame of the focus stack where the target object is in focus, whereas a pixel that captures the background will be taken from a frame of the focus stack where the pixel matches a selected blur.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images at multiple depths and, as a result, multiple points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera" or "image capture device" refers to a single lens assembly along with the sensor element and other circuitry utilized to capture an image. For purposes of this disclosure, two or more cameras may share a single sensor element and other circuitry, but include two different lens assemblies. However, in one or more embodiments, two or more cameras may include separate lens assemblies as well as separate sensor elements and circuitry.

Referring to FIG. 1, a simplified block diagram of camera system 100 is depicted, in accordance with one or more embodiments of the disclosure. Camera system 100 may be part of a camera, such as a digital camera. Camera system 100 may also be part of a multifunctional device, such as a mobile phone, tablet computer, personal digital assistant, portable music/video player, or any other electronic device that includes a camera system.

Camera system 100 may include one or more lenses 105. More specifically, as described above, lenses 105A and 105B may actually each include a lens assembly, which may include a number of optical lenses, each with various lens characteristics. For example, each lens may include its own physical imperfections that impact the quality of an image captured by the particular lens. When multiple lenses are combined, for example in the case of a compound lens, the various physical characteristics of the lenses may impact the characteristics of images captured through the lens assembly, such as focal points. In addition, each of lenses 105A and 105B may have similar characteristics, or may have different characteristics, such as a different depth of field (DOF).

As depicted in FIG. 1, camera system 100 may also include an image sensor 110. Image sensor 110 may be a sensor that detects and conveys the information that constitutes an image. Light may flow through the lens 105 prior to being detected by image sensor 110 and be stored, for example, in memory 115. In one or more embodiments, the camera system 100 may include multiple lens systems 105A and 105B, and each of the lens systems may be associated with a different sensor element, or, as shown, one or more of the lens systems may share a sensor element 110.

Camera system 100 may also include an actuator 130, and mode select input 140. In one or more embodiments, actuator 130 may manage control of one or more of the lens assemblies 105. For example, the actuator 130 may control focus and aperture size. Orientation sensor 135 and mode select input 140 may supply input to control unit 145. In one embodiment, camera system may use a charged coupled device (or a complementary metal-oxide semiconductor as image sensor 110), an electro-mechanical unit (e.g., a voice coil motor) as actuator 130.

Figure 2:
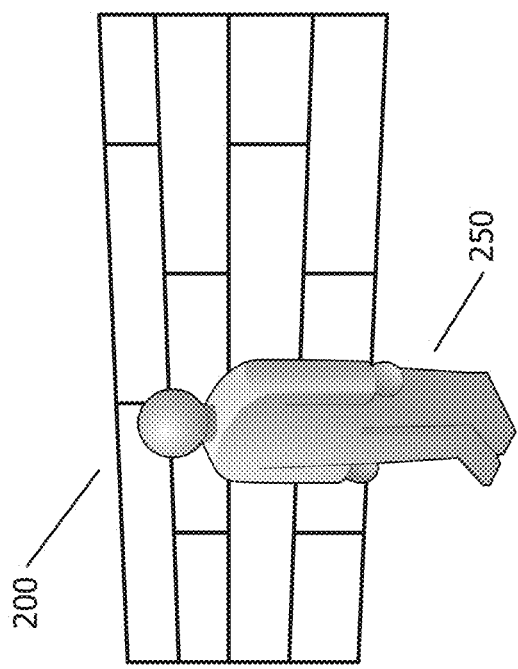
FIG. 2 shows, in block diagram form, an example multi camera system for capturing stereo image data.
Figure 2:
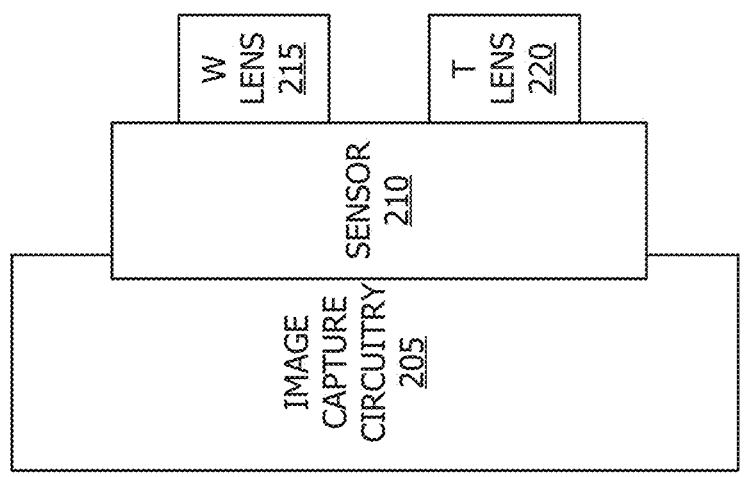

Turning to FIG. 2, an example block diagram is depicted indicating a type of camera system that may be calibrated according to one or more embodiments. In one or more embodiments, lens 215 and lens 220 may be independent lens assemblies, each having their own optical characteristics, that capture images of a scene in different ways. In one or more embodiments, image capture circuitry 205 may include two (or more) lens assemblies. For purposes of the example, the camera system may include a wide angle lens 215 and a telescopic lens 220. Each lens assembly may have different characteristics, such as a different focal length. For example, wide angle lens 240 may have a wider focal length 240 than the focal length of the telescopic lens 230. Each lens assembly may have a separate associated sensor element 210. Alternatively, two or more lens assemblies may share a common sensor element. A scene captured by the camera system may be distinguished into a background 200 and a foreground target image 250. For example in one or more embodiments, the camera system may be used to capture a portrait of person 250, who is standing in front of a background 200.

Figure 3:
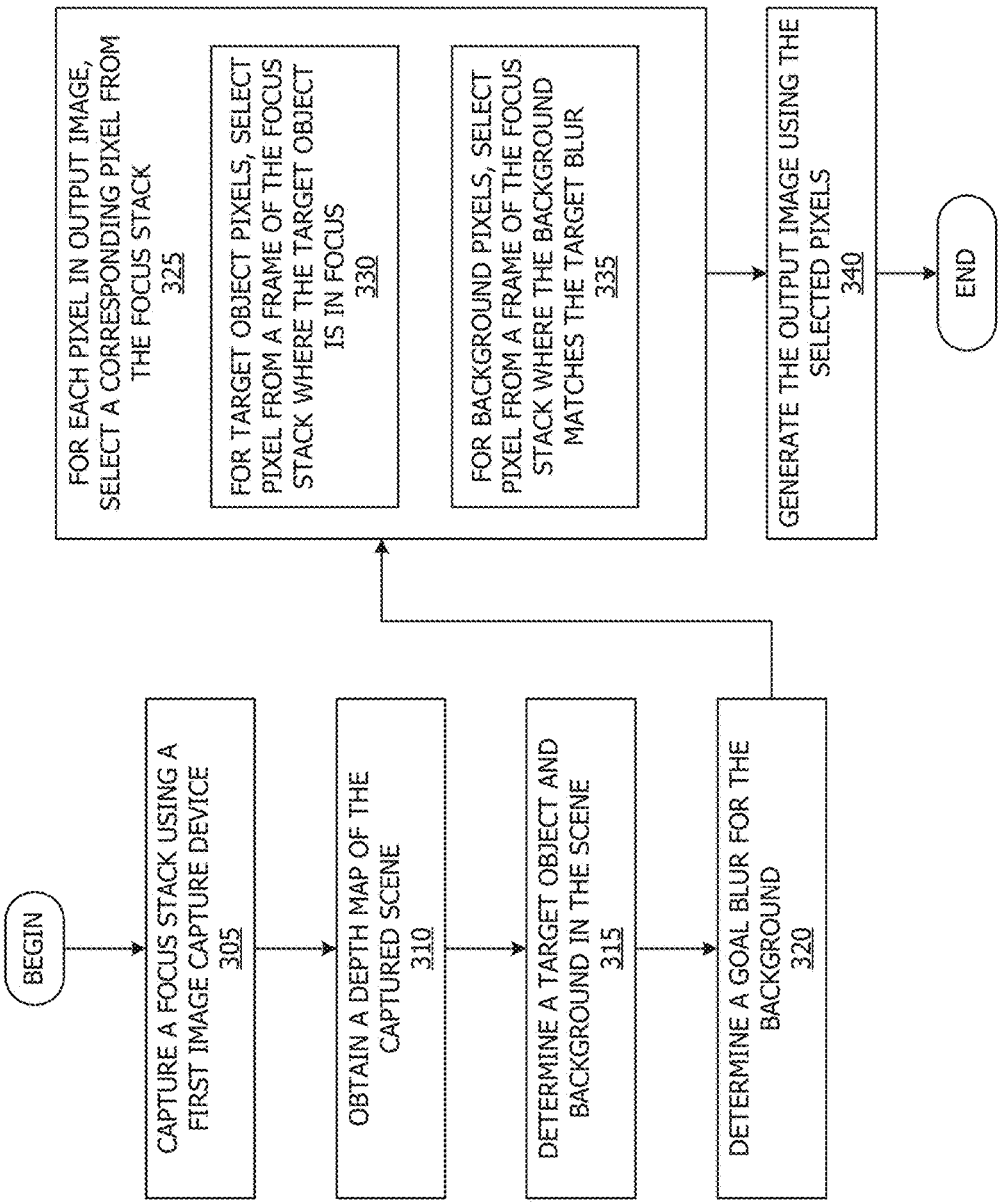
FIG. 3 shows, flow chart form, method for generating an image with a selected level of background blur, according to one or more embodiments

Turning to FIG. 3, a method for generating an image with a selected level of background blur is presented in the form of a flow chart. Although the steps are depicted in a particular order, the various steps in the flowchart could occur in a different order. In addition, any of the various steps could be omitted, or other steps could be included, according to embodiments.

The flow chart begins at 305, and a focus stack is captured using a first image capture device. In one or more embodiments, the focus stack may be captured at a number of predetermined depths capturing images of a scene at different focus depths. Thus, each image, or frame, in the focus stack will show the contents of the scene at various levels of blur or sharpness.

The flow chart continues at 310, and a depth map of the captured scene is obtained. In one or more embodiments, the depth map may be generated using a depth-from-focus or a depth-from-defocus method, or any other means for generating a depth map.

The flow chart continues at 315, and a target object and a background are determined in the scene. In one or more embodiments, the depth map will indicate a depth at which an object in the image appears. Thus, the target object, such as a person in a portrait, will be apparent by the depth map because it will be the object closer to the camera, whereas the background is farther away.

The method continues at 320, and a goal blur for the background is determined. In one or more embodiments, the goal blur may be determined, for example, based on an aperture of a second camera if the camera is part of a stereo camera system. In one or more embodiments, the goal blur may be based on a lookup table which replicates the effects used by a target SLR camera, for example. The lookup table may be stored in memory and indicate at what depth a blur matches that which occurs in the target SLR camera, for example. As another example, the target lookup function may determine at what focus setting a camera must be focused in order to capture an object at a certain distance with a given amount of blur. In one or more embodiments, blur functions may be used which determine a blur size for a given focus distance, object distance, and aperture size, where the aperture size may be based, for example, on a target SLR camera that is being mimicked.

In one or more embodiments, the goal blur may alternatively, or additionally, be determined based on user input. For example, a user may prefer more or less background blur than that normally produced by a target SLR camera. As an example, blur may be a function of the depth of the target object, the depth at which blur is desired, and the target size of a target SLR camera.

The method continues at 325 and for each pixel that will occur in the output image, a corresponding pixel is selected from the focus stack. In one or more embodiments, the frames in the focus stack may be aligned such that any pixel in any of the frames will align with corresponding pixels in the other frames. Selecting the pixels includes at 330, for target object pixels, selecting pixels from a frame of the focus stack where the target object is in focus. In one or more embodiments, determining where the object is in focus may be accomplished, for example, using edge detection or sharpness metrics. Selecting the pixels also includes at 335, for background pixels, selecting pixels from a frame of the focus stack where the background matches a target blur. In one or more embodiments, the various pixels of the background may have different depths. For example, the background may include multiple objects. In one or more embodiments, different parts of the background, for example relating to the different background objects, may also have a different target blur. In one or more embodiments, the frame may be determined based on a predetermined depth as indicated by a lookup table, for example. Selecting pixels for the output image will be discussed in further detail below with respect to FIG. 5.

The method continues at 340, and the output image is generated using the selected pixels. Thus, in one or more embodiments, the output image may be comprised of various pixels selected from different frames of the focus stack to capture the image at varying focus settings.

Figure 4:
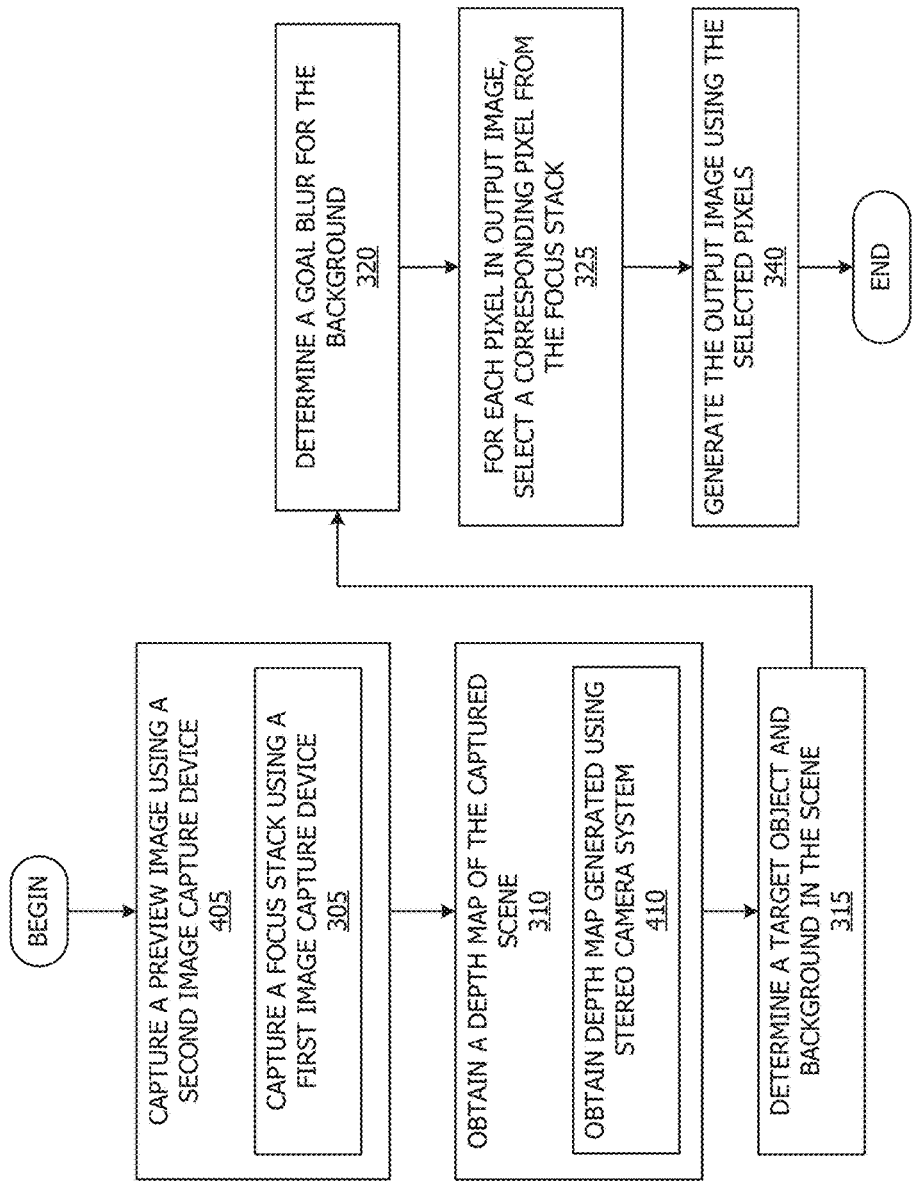
FIG. 4 shows, in flow chart form, an example method of generating an image with a selected level of background blur using a multi-camera system, according to one or more embodiments.

Referring now to FIG. 4, an example flow chart is depicted of a method of generating a depth map, according to one or more embodiments of the invention. Although the steps are depicted in a particular order, the various steps in the flowchart could occur in a different order. In addition, any of the various steps could be omitted, or other steps could be included, according to embodiments. FIG. 4 shows many of the steps featured in FIG. 3, with some additions and omissions. It should be understood that any combination of the various steps of all of the flow charts in FIG. 3, FIG. 4, and FIG. 5 may be combined in any number of ways, according to one or more embodiments.

FIG. 4 differs from FIG. 3 in that FIG. 4 shows at 405 that during the capture of the focus stack by the first image capture device, a preview image may be captured by a second image capture device. In one or more embodiments, the first and second image capture devices may be part of a stereo camera or multi-camera system, such as that shown in FIG. 1. In one or more embodiments, the first image capture device and the second image capture device may have different depth of fields. For example, the first image capture device may include a telescopic lens, whereas the second image capture device may include a wide angle lens. In one or more embodiments, the focus stack may be captured at 305 to simulate decreasing the depth-of-field of the second image capture device.

In one or more embodiments, capturing a preview image using a second image capture device allows a user to focus the camera system on the object and still see the target object in focus while the first image capture device captures images at a number of different depths. Thus, the second image capture device may improve a user experience.

FIG. 4 also differs from FIG. 3 because at 310, obtaining a depth map of the captured scene may include at 410, generating a depth map using a stereo camera system. In one or more embodiments, the depth map may be calculated in a variety of ways. For example, in a stereo camera system, a depth-from-focus or depth-from-defocus method may be used. In addition, the use of a stereo or multi-camera system may reduce errors due to movement. For example, a comparison of the blur between two images of the object captured at the same time by the different image capture devices may provide more insight regarding the depth map.

Figure 5:
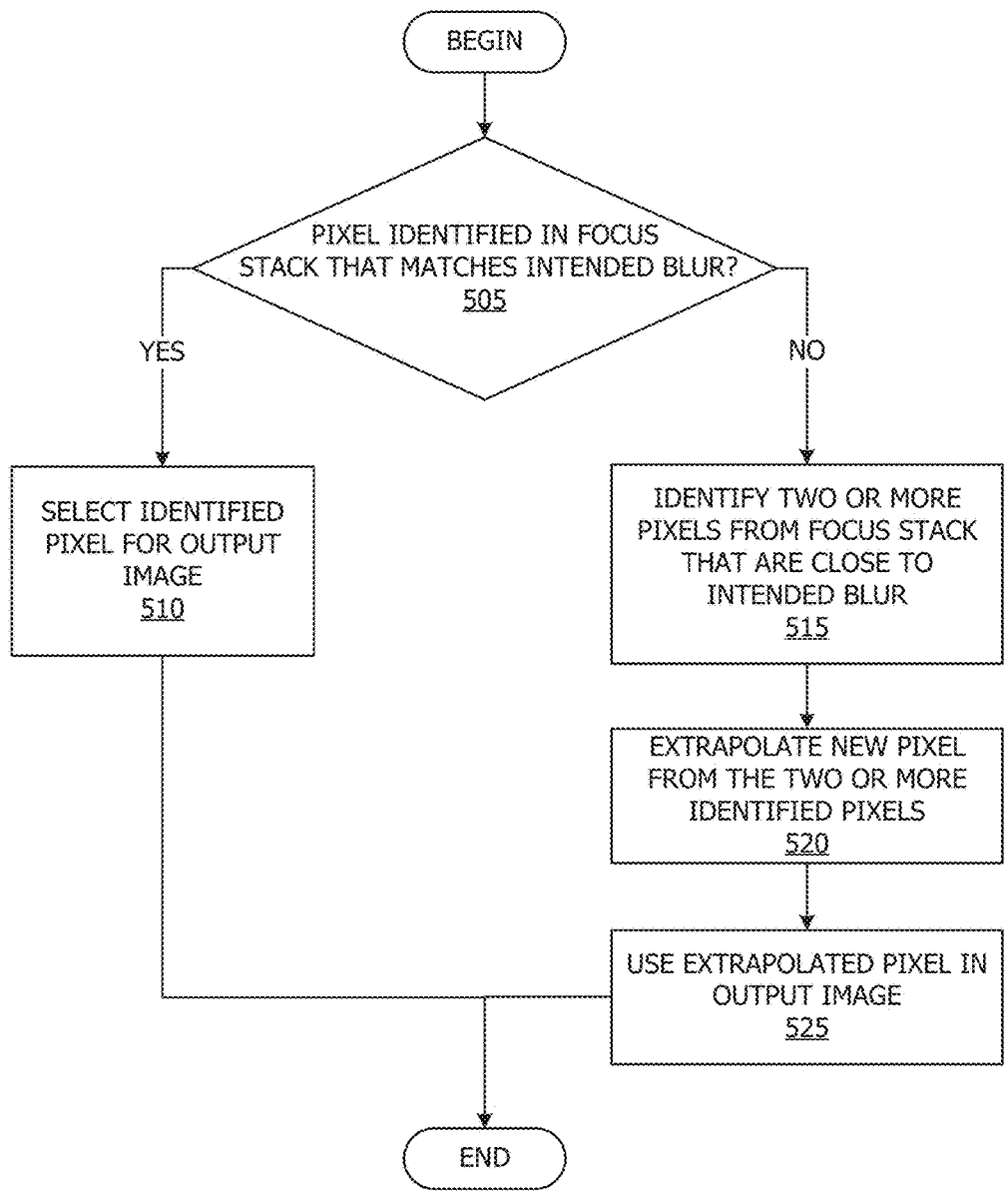
FIG. 5 shows, in flow chart form, an example method of selecting pixels for an image with a selected level of background blur, according to one or more embodiments.

FIG. 5 shows, in flow chart form, an example method of selecting pixels for an image with a selected level of background blur, according to one or more embodiments. In one or more embodiments, the frames captured in the focus stack may not have the desired blur, whether that blur is a sharpness in the case of the foreground target object, or a particular selected blur for the background, it may be necessary to extrapolate a particular pixel. The flow chart presented in FIG. 5 is intended to show a more specific example of how each pixel for the output image is selected, for example, in 325 of FIGS. 3-4.

The method begins at 505 and a determination is made regarding whether there exists a pixel that matches the intended blur. For purposes of this step, the intended blur may refer to a goal blur in the case of a pixel for the background of the scene, or the intended blur may refer to a focused object in the case of a pixel for the target object of the scene. If at 505 it is determined that a pixel does exist in the focus stack that matches the intended blur, then the flow chart continues at 510, and the identified pixel that matches the intended blur is selected and used for the output image.

Returning to 505, if it is determined that a pixel is not identified that matches the intended blur, then the method continues at 515. Two or more pixels from the focus stack are identified that are close to the intended blur. For example, if the intended blur is not found in any of the images in the focus stack, two or more images may be used to interpolate the intended blur. This may be useful, for example, to give a smoother image on a plane sloping into an image, such as a table or wall, so as to avoid jumps between discrete levels of blur. As another example, if it is determined that a particular focus position should have rendered the correct pixel but that pixel is unusable either due to clipping or any other circumstance, then the frames just before and just after the frame including the pixel in the focus stack may be identified.

The method continues at 520, and a new pixel is extrapolated based on the two or more identified pixels. For example, the identified pixels may be blended, or used to select a best guess of the pixel, or any other means. The method continues at 525, and the extrapolated pixel is used in generating the output image.

Figure 6:
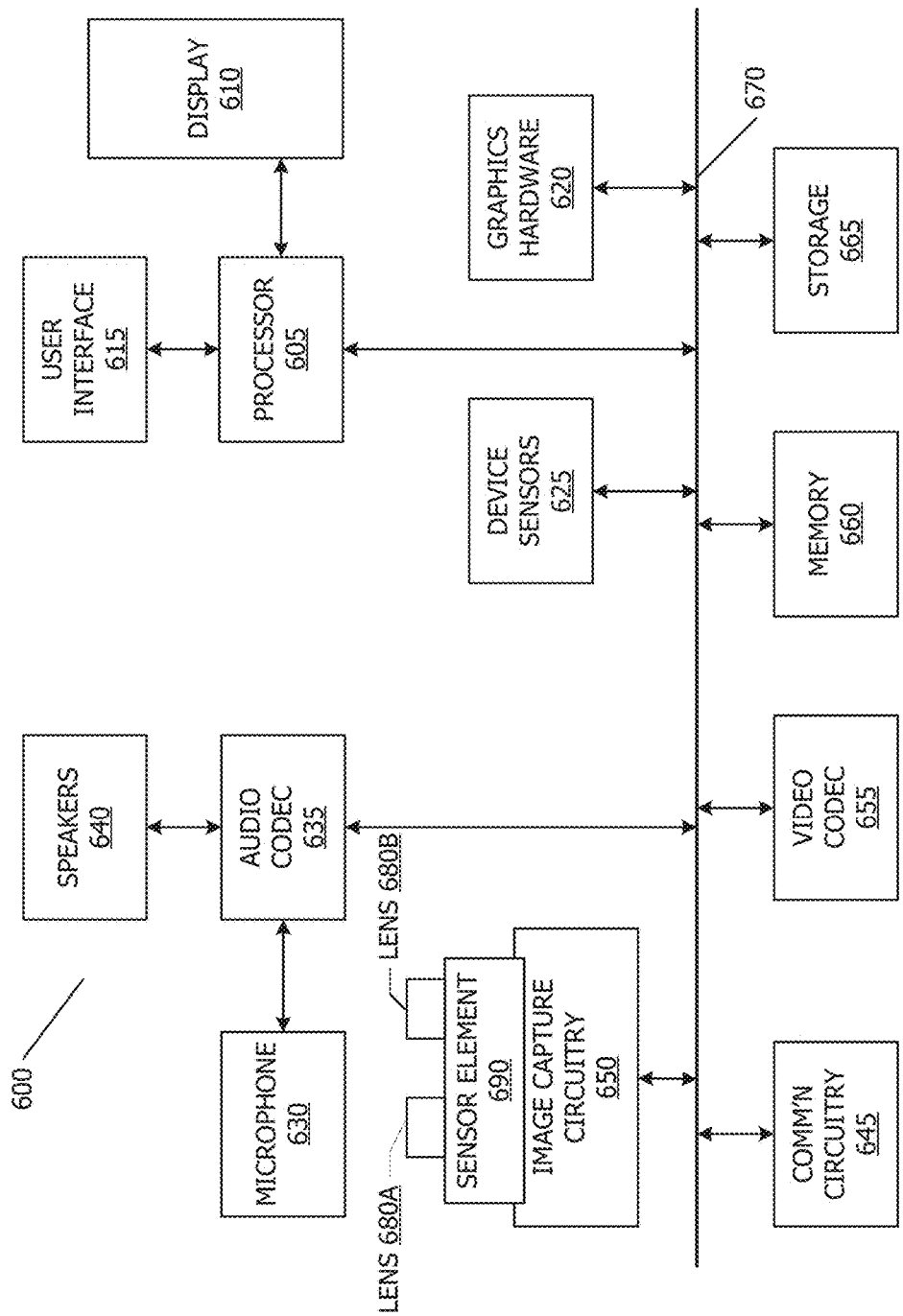
FIG. 6 shows, in block diagram form, a simplified multifunctional device according to one or more embodiments.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including camera system 100) video codec(s) 655 (e.g., in support of digital image capture unit 650), memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images and single and multi-camera calibration as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable GPU.

Image capture circuitry 650 may include two (or more) lens assemblies 680A and 680B, where each lens assembly may have a separate focal length. For example, lens assembly 680A may have a short focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 665 and/or processor 605 and/or graphics hardware 620, and/or a dedicated image processing unit or pipeline incorporated within circuitry 665. Images so captured may be stored in memory 660 and/or storage 655.

Sensor and camera circuitry 650 may capture still and video images that may be processed in accordance with this disclosure, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

In one or more embodiments, a shallow depth-of-field look may be generated using a single or multi-camera system, without the need for larger lenses and sensors such as those on digital single-lens reflex (DSLR) cameras. As an example, a portrait photo may benefit from the defocusing of the background, while the foreground, or target object, remains in focus. The effect may be added artificially through the use of software. In one or more embodiments, the output image may be generated using a focus stack and, thus, some or all of the synthetic blurring may be avoided. However, in one or more embodiments, artificial blur may be added on top of the optical blurring in order to maximize the effect, for example.

Finally, variations of the above-described embodiments may be used in combination with each other. Many other embodiments will be apparent to those of skill in the art upon reviewing the above description. Further, in the case of flow charts described above, the various steps may be depicted in a particular order, but the order in which the features are depicted should not be considered limiting. That is, the various features of the flow chart may occur in a different order, or some may be omitted, or occur concurrently, according to one or more embodiments. The scope of the disclosed subject matter therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method of generating an image with a selected level of background blur, comprising:
    capturing, by at least a first image capture device, a plurality of frames of a scene, wherein each of the plurality of frames has a different focus depth;
    obtaining a depth map of the scene;
    determining a target object and a background in the scene based on the depth map;
    determining a target blur value for each pixel in an output image corresponding to the background, wherein the output image comprises a plurality of pixels;
    selecting, for each pixel in the output image, a corresponding pixel from the plurality of frames, comprising:
        selecting, for each pixel corresponding to the target object, a corresponding pixel from a frame in the plurality of frames where the target object is in focus, and
        selecting, for each pixel corresponding to the background, a corresponding pixel from a frame in the plurality of frames wherein a blur value for the selected pixel corresponds to the target blur value for the respective pixel in the output image; and
    generating the output image, wherein the output image comprises:
        at each pixel location corresponding to the target object, the selected corresponding pixel from the plurality of frames where the target object is in focus; and
        at each pixel location corresponding to the background, the selected corresponding pixel from the plurality of frames wherein the blur value for the selected pixel corresponds to the target blur value for the respective pixel in the output image.

2. The method of claim 1, wherein obtaining a depth map of the scene comprises obtaining a depth map of the scene using the first image capture device and a second image capture device, wherein the first image capture device and the second image capture device are part of a stereo camera system.

3. The method of claim 2, wherein a focal length of the first image capture device is different than a focal length of the second image capture device.

4. The method of claim 2, further comprising:
concurrently to capturing the plurality of frames, capturing a preview image using the second image capture device.

5. The method of claim 1, wherein selecting, for each pixel corresponding to the target object further comprises, for a first one of the pixels corresponding to the target object:
selecting a first pixel from a first frame of the plurality of frames and a corresponding second pixel from a second frame from the plurality of frames, and
blending the first pixel and the second pixel to obtain a blended pixel corresponding to the target object, wherein the blended pixel is treated as the selected corresponding pixel for the first one of the pixels corresponding to the target object.

6. The method of claim 1, wherein selecting, for each pixel corresponding to the background further comprises, for a first one of the pixels corresponding to the background:
selecting a first background pixel from a first frame of the plurality of frames based on the target blur value for the first one of the pixels corresponding to the background in the output image;
selecting a second pixel from a second frame of the plurality of frames, wherein the second pixel corresponds to the first background pixel; and
blending the first background pixel and second pixel to obtain a blended pixel corresponding to the background, wherein the blended pixel is treated as the selected corresponding pixel for the first one of the pixels corresponding to the background.

7. The method of claim 1, wherein:
the target blur value for each pixel in the output image corresponding to the background is based, at least in part, on a depth of the respective pixel, as obtained from the depth map of the scene.

8. A system for generating an image with a selected level of background blur, comprising:
a first lens assembly;
a digital image sensor configured to receive light from the first lens assembly; and
a memory operatively coupled to the digital image sensor and comprising computer code configured to cause one or more processors to:
capture, by at least the first lens assembly, a plurality of frames of a scene, wherein each of the plurality of frames has a different focus depth;
obtain a depth map of the scene;
determine a target object and a background in the scene based on the depth map;
determine a target blur value for each pixel in an output image corresponding to the background, wherein the output image comprises a plurality of pixels;
select, for each pixel in the output image, a corresponding pixel from the plurality of frames, wherein the computer code configured to cause one or more processors to select further comprises computer code configured to cause one or more processors to:
select, for each pixel corresponding to the target object, a corresponding pixel from a frame in the plurality of frames where the target object is in focus, and
select, for each pixel corresponding to the background, a corresponding pixel from a frame in the plurality of frames wherein a blur value for the selected pixel corresponds to the target blur value for the respective pixel in the output image; and
generate the output image, wherein the output image comprises:
at each pixel location corresponding to the target object, the selected corresponding pixel from the plurality of frames where the target object is in focus; and
at each pixel location corresponding to the background, the selected corresponding pixel from the plurality of frames wherein the blur value for the selected pixel corresponds to the target blur value for the respective pixel in the output image.

9. The system of claim 7, further comprising:
a second lens assembly,
wherein the computer code configured to cause one or more processors to obtain a depth map of the scene further comprises computer code configured to cause one or more processors to: obtain a depth map of the scene using the first lens assembly and the second lens assembly, wherein the first lens assembly and the second lens assembly are part of a stereo camera system.

10. The system of claim 9, wherein a focal length of the first lens assembly is different than a focal length of the second lens assembly.

11. The system of claim 9, wherein the computer code is further configured to cause one or more processors to: capture a preview image using the second image capture device concurrently to the capture of the plurality of frames.

12. The system of claim 8, wherein the computer code configured to cause one or more processors to select, for each pixel corresponding to the target object further comprises computer code configured to cause one or more processors to, for a first one of the pixels corresponding to the target object:
select a first pixel from a first frame of the plurality of frames and a corresponding second pixel from a second frame from the plurality of frames, and
blend the first pixel and the second pixel to obtain a blended pixel corresponding to the target object, wherein the blended pixel is treated as the selected corresponding pixel for the first one of the pixels corresponding to the target object.

13. The system of claim 8, wherein the computer code configured to cause one or more processors to select, for each pixel corresponding to the background further comprises computer code configured to cause one or more processors to, for a first one of the pixels corresponding to the background:
select a first background pixel from a first frame of the plurality of frames based on the target blur value for the first one of the pixels corresponding to the background in the output image;
select a second pixel from a second frame of the plurality of frames, wherein the second pixel corresponds to the first background pixel; and
blend the first background pixel and second pixel to obtain a blended pixel corresponding to the background, wherein the blended pixel is treated as the selected corresponding pixel for the first one of the pixels corresponding to the background.

14. The system of claim 8, wherein:
the target blur value for each pixel in the output image corresponding to the background is based, at least in part, on a depth of the respective pixel, as obtained from the depth map of the scene.

15. A non-transitory computer readable medium comprising computer code for generating an image with a selected level of background blur, the computer code executable by one or more processors to:
- capture, by at least a first image capture device, a plurality of frames of a scene, wherein each of the plurality of frames has a different focus depth;
- obtain a depth map of the scene;
- determine a target object and a background in the scene based on the depth map;
- determine a target blur value for each pixel in an output image corresponding to the background, wherein the output image comprises a plurality of pixels;
- select, for each pixel in the output image, a corresponding pixel from the plurality of frames, wherein the computer code executable by one or more processors to select further comprises computer code executable by one or more processors to:
  - select, for each pixel corresponding to the target object, a corresponding pixel from a frame in the plurality of frames where the target object is in focus, and
  - select, for each pixel corresponding to the background, a corresponding pixel from a frame in the plurality of frames wherein a blur value for the selected pixel corresponds to the target blur value for the respective pixel in the output image; and
- generate the output image, wherein the output image comprises;
  - at each pixel location corresponding to the target object, the selected corresponding pixel from the plurality of frames where the target object is in focus; and
  - at each pixel location corresponding to the background, the selected corresponding pixel from the plurality of frames wherein the blur value for the selected pixel corresponds to the target blur value for the respective pixel in the output image.

16. The non-transitory computer readable medium of claim 15, wherein the computer code executable by one or more processors to obtain a depth map of the scene further comprises computer code executable by one or more processors to: obtain a depth map of the scene using the first image capture device and a second image capture device, wherein the first image capture device and the second image capture device are part of a stereo camera system.

17. The non-transitory computer readable medium of claim 16, wherein a focal length of the first image capture device is different than a focal length of the second image capture device.

18. The non-transitory computer readable medium of claim 15, wherein the computer code executable by one or more processors to select, for each pixel corresponding to the target object, further comprises, for a first one of the pixels corresponding to the target object, computer code executable by one or more processors to:
- select a first pixel from a first frame of the plurality of frames and a corresponding second pixel from a second frame from the plurality of frames, and
- blend the first pixel and the second pixel to obtain a blended pixel corresponding to the target object, wherein the blended pixel is treated as the selected corresponding pixel for the first one of the pixels corresponding to the target object.

19. The non-transitory computer readable medium of claim 15, wherein the computer code executable by one or more processors to selecting, for each pixel corresponding to the background, further comprises, for a first one of the pixels corresponding to the background, computer code executable by one or more processors to:
- select a first background pixel from a first frame of the plurality of frames based on the target blur value for the first one of the pixels corresponding to the background in the output image;
- select a second pixel from a second frame of the plurality of frames, wherein the second pixel corresponds to the first background pixel; and
- blend the first background pixel and second pixel to obtain a blended pixel corresponding to the background, wherein the blended pixel is treated as the selected corresponding pixel for the first one of the pixels corresponding to the background.

20. The non-transitory computer readable medium of claim 15, wherein:
- the target blur value for each pixel in the output image corresponding to the background is based, at least in part, on a depth of the respective pixel, as obtained from the depth map of the scene.

* * * * *

UNITED STATES PATENT AND TRADEMARK OFFICE
CERTIFICATE OF CORRECTION

PATENT NO. : 10,284,835 B2
APPLICATION NO. : 14/864650
DATED : May 7, 2019
INVENTOR(S) : Thomas E. Bishop et al.

Page 1 of 1

It is certified that error appears in the above-identified patent and that said Letters Patent is hereby corrected as shown below:

In the Claims

Claim 19, at Column 12, Line number 22, replace "selecting" with -- select --

Signed and Sealed this
Eighteenth Day of June, 2019

Andrei Iancu
*Director of the United States Patent and Trademark Office*